(12) United States Patent
Levin et al.

(10) Patent No.: US 8,264,990 B2
(45) Date of Patent: Sep. 11, 2012

(54) USING CONSULTATION CALL TO TRANSFER CALL ACROSS ENDPOINTS

(75) Inventors: Danny Levin, Redmond, WA (US); Marc Boyer, Seattle, WA (US); Arulkumar Elumalai, Lynnwood, WA (US); Rajesh Ramanathan, Redmond, WA (US); Vinit Deshpande, Woodinville, WA (US); Sumit Garg, Redmond, WA (US); Mahendra Sekaran, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 12/697,400

(22) Filed: Feb. 1, 2010

(65) Prior Publication Data

US 2011/0188410 A1  Aug. 4, 2011

(51) Int. Cl.
   *H04L 12/16*  (2006.01)
(52) U.S. Cl. .................................. 370/259; 455/439
(58) Field of Classification Search .............. 370/259, 370/401; 455/414.3
   See application file for complete search history.

(56) References Cited

U.S. PATENT DOCUMENTS

| | | | | |
|---|---|---|---|---|
| 5,732,128 A * | 3/1998 | Bushnell | ...................... | 379/119 |
| 2004/0062230 A1 | 4/2004 | Taylor | | |
| 2005/0047395 A1 | 3/2005 | Narin | | |
| 2005/0249196 A1 | 11/2005 | Ansari | | |
| 2007/0165605 A1 | 7/2007 | Nguyen | | |
| 2008/0057962 A1 | 3/2008 | Shuiping | | |
| 2009/0168757 A1 | 7/2009 | Bush | | |
| 2009/0245499 A1 | 10/2009 | Chigasaki | | |
| 2010/0279670 A1* | 11/2010 | Ghai et al. | ................. | 455/414.3 |
| 2011/0096752 A1* | 4/2011 | Yuk et al. | ...................... | 370/331 |

OTHER PUBLICATIONS

Avaya Unified Commuications Solutions, Avaya, Inc., Copyright © 2008, 4 pages.
Enterprise Mobility Gateway Solution Brief accessed on Dec. 1, 2009, accessed at: http://www.counterpath.net/assets/files/745/CP_EMG_Solution_Brief.pdf; 6 pages.
Feundlich, Gene (Lucent Technologies), Call Transfer for Gatekeeper-Routed Model, ITU Telecommunication Standardization Sector, published Jun. 1997, 4 pages.
Voice Extensible Markup Language (VoiceXML) 2.1, WC3®, Copyright © 2004, 26 pages.

* cited by examiner

*Primary Examiner* — Dang Ton
*Assistant Examiner* — Kevin Lee
(74) *Attorney, Agent, or Firm* — Merchant & Gould

(57) ABSTRACT

A method for transferring a telephone call from a client computer to a second electronic device includes establishing a connection for a telephone call between the client computer and a first electronic device, and sending a request to a server computer to transfer the telephone call from the client computer to the second electronic device, the client computer and the second electronic device having the same user, the request initiating a consultation call to the second electronic device. The method also includes receiving a response from the server computer that the second electronic device has accepted the telephone call, and replacing the client computer with the second electronic device as a party in the telephone call with the first electronic device, the continuity of the telephone call being maintained at the first electronic device during the time that the client computer is replaced with the second electronic device.

20 Claims, 7 Drawing Sheets

USING CONSULTATION CALL TO TRANSFER CALL ACROSS ENDPOINTS

BACKGROUND

Voice over IP (VOIP) is a technology that permits the delivery of voice communications over networks that implement the Internet Protocol (IP), such as the Internet. A VOIP network includes a plurality of client computers running software that supports VOIP. Voice connections can be created between client computers. Other devices, for example landline or mobile phones, can be connected to the VOIP network using a gateway. In addition, a mobile phone that runs VOIP software can be directly connected to a VOIP network.

Because more than one device, for example a landline and a mobile phone, may be for the same user, a user may want to transfer a telephone call received on one user device to another user device. In order to facilitate a telephone call transfer from one device to another device for the same user, a VOIP network may include one or more dedicated server computers, in some examples known as anchor servers, in which a telephone call is anchored for devices of the same user. An anchor server provides a fixed connection to a remote party in which a telephone call to the remote party can be switched from one user device to another use device.

SUMMARY

One aspect relates to a method for transferring a telephone call from a first electronic device to a second electronic device, the method including: at the first electronic device, a connection for a telephone call is established between the first electronic device and a third electronic device. A request is sent to a server computer to transfer the telephone call from the first electronic device to the second electronic device. The first electronic device and the second electronic device have the same user. The request causes a connection to be established between the first electronic device and the second electronic device while maintaining the connection between the first electronic device and the third electronic device. The third electronic device is not put on hold while the connection between the first electronic device and the second electronic device is established. A response is received from the server computer that the second electronic device accepted the telephone call. The first electronic device is replaced with the second electronic device as a party in the telephone call with the third electronic device. The continuity of the telephone call is maintained at the third electronic device during the time that the first electronic device is replaced with the second electronic device. The telephone call is terminated at the first electronic device.

Another aspect includes a first electronic computing device that is configured to run a communications application. The first electronic computing device includes a computer readable storage medium, and a processing unit that executes computer readable instructions stored on the computer readable storage medium. The processing unit creates a user interface module that controls a user interface at the first electronic device, and a business logic module. The business logic module implements communication functions for the communications application. The business logic module further includes a call manager that processes requests to establish a telephone call connection from the first electronic computing device to a second electronic computing device, and a services manager that processes requests to transfer a telephone call established at the first electronic computing device to a mobile phone. The first electronic device and the mobile phone have the same user. The telephone call is transferred using a consultation transfer call protocol that transfers the telephone call from the first electronic computing device to the mobile phone without putting the telephone call on hold. The service manager maintains continuity of the telephone call on the first electronic device while the telephone call is being transferred.

The details of one or more techniques are set forth in the accompanying drawings and the description below. Other features, objects, and advantages of these techniques will be apparent from the description, drawings, and claims.

DETAILED DESCRIPTION

Figure 1:
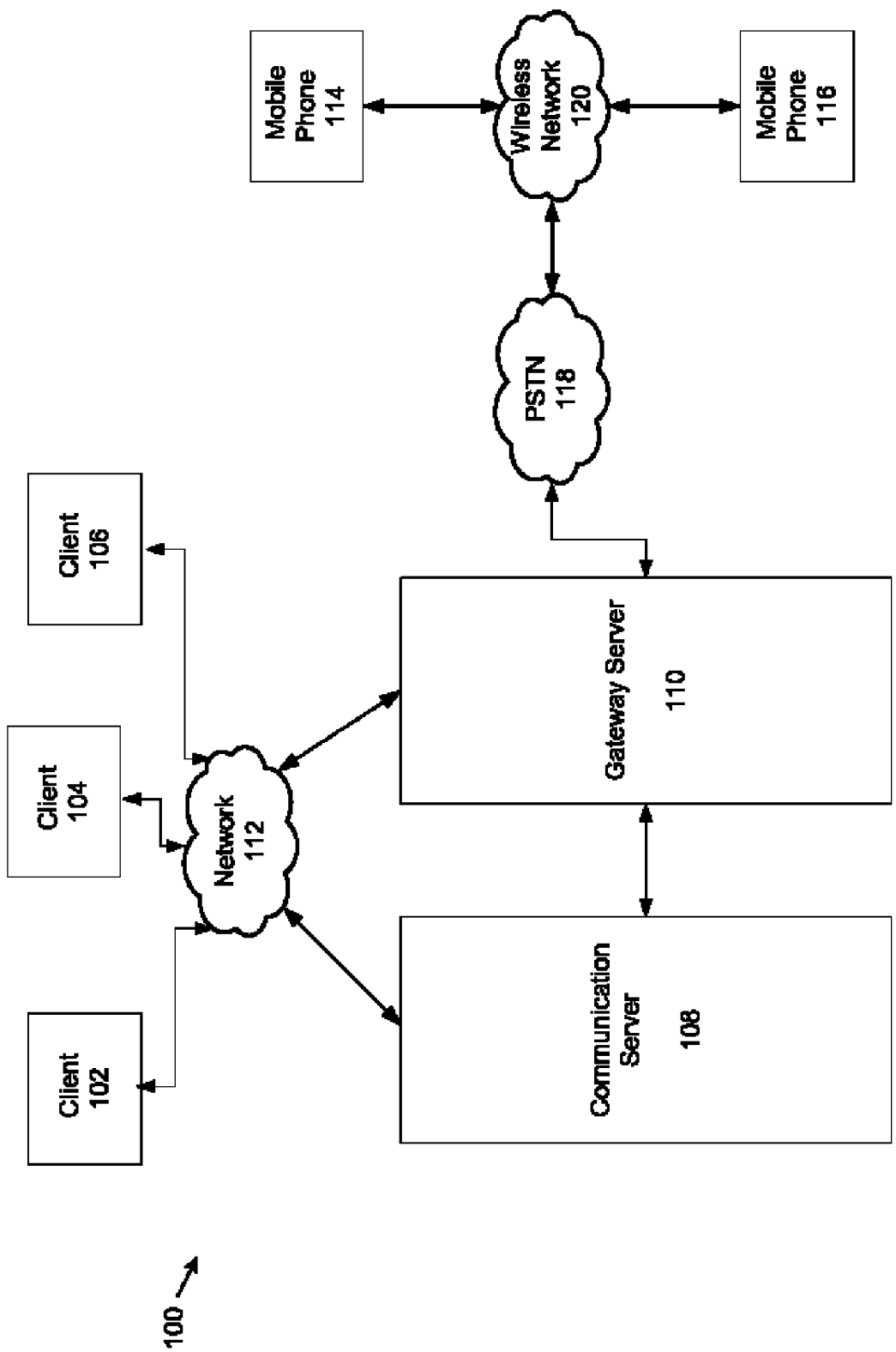
FIG. 1 shows an example system for consultation call transfer across endpoints in a VOIP network.

The present application is directed to systems and methods for using a consultation call to seamlessly transfer a telephone call from one user device to another device of the same user on a VOIP network.

In some examples, a call is transferred from a client computer to a mobile phone of the same user or from a client computer to another device of the same user without making use of an anchor server. The consultation call allows the telephone call to be transferred without putting the call on hold while the call is being transferred. In this manner, the telephone call is transferred seamlessly so that other users on devices that are connected to the client computer are unaware that the call is being transferred, and so that the continuity of the call is maintained during the transfer process. In some examples, an anchor server is not required, improving the efficiency of the call transfer process and reducing capital equipment expenses for the VOIP network. In some examples, a consultation call that allows a telephone call to be transferred from one device to another device of the same user is known as a handoff.

A consultation call is a telephone call in which a person that wishes to transfer a call calls the person to whom the call is to be transferred to determine whether that person is willing to accept the call. If the person to whom the call is to be transferred is willing to accept the call, the person who wants to transfer the call typically presses a transfer button on his/her phone, and the call is then transferred. The consultation call can be initiated from a phone on the public switched telephone network (PSTN) or from a client computer running VOIP software on a VOIP network.

In a VOIP network, voice information is converted into packets of information that are sent between nodes in the network. The nodes typically include client computers, server computers, routers and gateways. Each packet of information is sent as part of a message that is sent between endpoint nodes in the network. For example, a client computer that initiates a telephone call is one endpoint node and a client computer that receives the call is a second endpoint node. A mobile phone to which a call is transferred is a third endpoint node. In this disclosure, a remote party is any endpoint other than the endpoint that initiates the transfer and the endpoint to which the call is to be transferred. The terms endpoint and endpoint node are used interchangeably.

Basic operations in a VOIP network are known as primitives. For example, initiating a telephone call is a primitive and a consultation call is a primitive. Each primitive includes messages sent between nodes in the network. A communication protocol provides rules for message transfer. A common communication protocol used in VOIP networks is the Session Internet Protocol (SIP), described in RFCs 3261, 3515, 5589 and other related RFCs. In examples, other communication protocols may be used. In the present disclosure, calls are transferred between endpoints in a seamless manner without putting the call on hold, ringing back any remote parties, and/or using an anchor server.

FIG. 1 shows an example system 100 that supports consultation call transfer across endpoints in a VOIP network. The example system 100 includes client computers 102, 104, 106, communication server 108, gateway server 110, network 112, mobile phones 114, 116, PSTN 118 and wireless network 120.

The example client computers 102, 104, 106 have a software program installed that supports VOIP communication. One example software program is Microsoft Office Communicator from Microsoft Corporation of Redmond, Wash. The example communication server 108 provides the infrastructure to support VOIP, instant messaging, video conferencing and other communication services. An example communication server is Microsoft Office Communications Server 2007 from Microsoft Corporation of Redmond, Wash. The example network 112 is a packet switched network such as the Internet. The example PSTN 118 is a public switched telephone network that uses circuit switching.

The example gateway server 110 is a server computer provides an interface between packet switched network 112 and circuit switched PSTN 118. Example mobile phones 114, 116 are accessible to PSTN 118 via wireless network 120. More or fewer client computers, communication servers, gateway servers and mobile phones can be used. Other types of devices, such as landline phones, can also be used.

Figure 2:
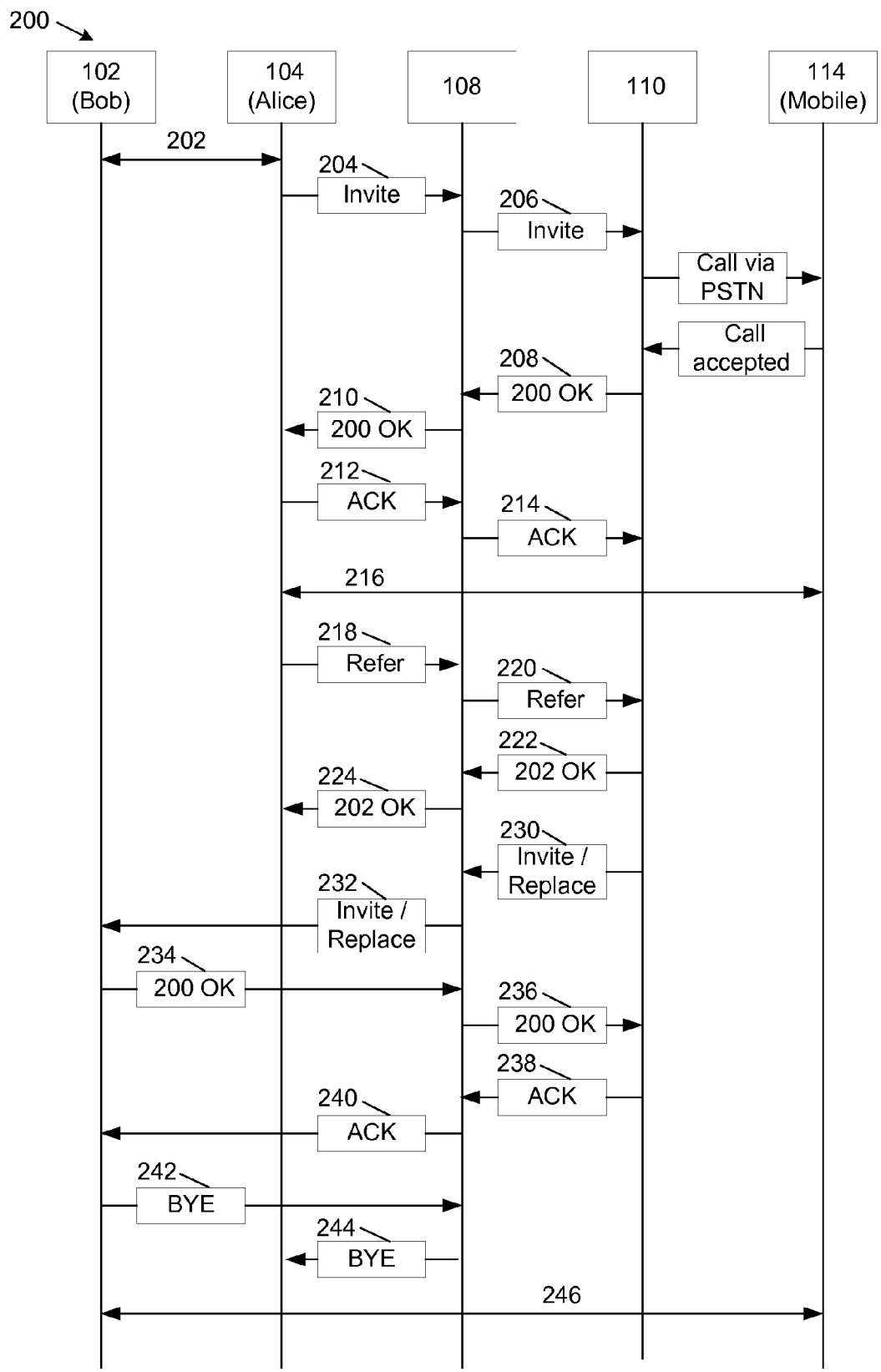
FIG. 2 shows message flow in an example consultation call transfer using the system of FIG. 1.

The following describes an example consultation call transfer, as illustrated in FIG. 2. First, a telephone call is established between two endpoints. For example a person at client computer 102, for example Bob, calls a person at client computer 104, for example Alice, and establishes a telephone call 202 between Bob and Alice. In this example, the telephone call is established between two VOIP nodes. However, in other examples, Bob may establish a telephone call from a landline telephone (not shown) connected to PSTN 118, from mobile phone 116 or from a client computer connected to a communication server other that communication server 108. Other locations from which Bob may establish the telephone call are possible. In other examples, Alice may initiate the telephone call instead of Bob.

At some point in the example telephone call between Alice and Bob, Alice may decide to transfer the telephone call to her mobile phone. For example, Alice may need to attend a meeting away from her office while still maintaining the telephone call. Using an user interface on client computer 104, Alice requests that the telephone call be transferred to her mobile phone, for example mobile phone 114. In examples, the user interface distinguishes between a handoff, in which a call is being transferred to a device of the same user and a traditional transfer in which a call is transferred to another user. Because Alice is transferring the call to herself, Alice presses a control on the user interface that represents a handoff, for example a handoff button.

At this point, a consultation call is initiated between client computer 104 and Alice's mobile phone 114. The pressing of the example handoff button on the user interface indicates to client computer 104 that the consultation call is a handoff to Alice rather that a traditional transfer to another user. Therefore, client computer 104 keeps call 202 active during the consultation call and does not put call 202 on hold during the consultation call.

In the consultation call between client computer 104 and mobile phone 114, a SIP Invite message 204 is sent from client computer 104 to communication server 108. The Invite message 204 includes an identifier for Alice's mobile phone 114. The Invite message 204 may include one or more parameters in the message header of Invite message 204. For example, one parameter may be a Skip RNL parameter that is used to skip a reverse lookup operation at the example communication server 108. In some examples, use of the Skip RNL parameter prevents the consultation call from being directed to any other of Alices's devices that may share the same phone number, for example a home phone. Another parameter may be the reject-contact:MSGSERVER parameter, that in some examples indicates that the consultation call should not be directed to voice mail on mobile phone 114.

When the example communication server 108 receives Invite message 204, the communication server 108 sends SIP Invite message 206 to example gateway server 110. The Invite message 206 includes parameters from the Invite message 204, including the identifier for Alice's mobile phone 114 and the Skip RNL parameter and the reject-contact:MSGSERVER parameter, if these parameters are included in Invite message 204. The SIP Invite message 206 indicates to gateway server 110 that the telephone call identified in SIP Invite message 206 is to be routed to mobile phone 114. The gateway server 110 then initiates a call to Alice's mobile phone 114. The call is sent to mobile phone 114 via PSTN 118 and wireless network 120.

When the SIP Invite message 206 is received at mobile phone 114, a ring tone is sounded at mobile phone 114. When Alice accepts the call, SIP 200 OK message 208 is sent from gateway server 110 to communication server 108 and SIP 200 OK message 210 is sent from communication server 108 to client computer 104. Client computer 104 then sends SIP ACK message 212 to communication server 108 and communication server 108 sends SIP ACK message 214 to gateway server 110. The SIP 200 OK messages and the SIP ACK provide a handshake between client computer 104 and mobile phone 114. When gateway server 110 receives SIP ACK message 214, a connection 216 is established between mobile phone 114 and client computer 104.

Because the connection 202 between Bob at client computer 102 and Alice at client computer 104 is maintained during the transfer process, when the connection 216 is established between mobile phone 114 and client computer 104, there are two at least two active connections—connection 202 between Bob at client computer 102 and Alice at client computer 104 and connection 216 between Alice at client computer 104 and mobile phone 114.

When the connection 216 between client computer 104 and mobile phone 114 is completed, client computer 104 sends SIP Refer message 218 to communication server 108 and communication server 108 sends SIP Refer message 220 to gateway server 110. SIP Refer message 220 is a request for gateway server 110 to send an Invite with Replace message to Bob at client computer 102 to replace client computer 104 with mobile phone 114 in the telephone call with Bob.

When gateway server 110 receives Refer message 220, gateway server 110 sends SIP 202 OK message 224 to communication server 108. In turn, communication server 108 sends SIP 202 OK message 224 to client computer 104.

After gateway server 110 sends SIP 202 OK message 224 to communication server 108, gateway server 110 sends SIP Invite with Replace message 230 to communication server 108. The SIP Invite with Replace message 230 is an SIP Invite message with a Replace parameter included in the message. SIP Invite with Replace message 230 also includes an identifier for the party in the telephone call to be replaced (client computer 104) and an identifier for the replacement party (mobile phone 114).

When communication server 108 receives SIP Invite with Replace message 230, communication server 108 sends SIP Invite with Replace message 232 to client computer 102. Client computer 102 then initiates an SIP OK/ACK handshake with gateway computer 110 which comprises messages 234, 236, 238 and 240. At the completion of the SIP OK/ACK handshake, a connection 246 is established between Bob at client computer 102 and Alice at mobile phone 114. In addition, when client computer 102 receives SIP ACK 240 from communication server 108, client computer 102 sends SIP BYE message 242 to client computer 108, and when client computer 108 receives SIP BYE message 242, client computer 108 sends SIP BYE message 244 to client computer 104 to end calls 202 and 216.

During the transfer and replacement process, the call is transferred from Alice's desktop connection at client computer 104 to Alice's mobile phone 114 without interruption of the call. From Alice's perspective, the call is transferred immediately when Alice accepts the consultation call at mobile phone 114. In addition, Bob is not provided with any indication that the call has been transferred to Alice's mobile phone 114. Furthermore, the call is transferred without using an anchor server.

The above example describes a seamless transfer of a telephone call from client computer 104 to mobile phone 114. However, other devices besides a mobile phone can be used. For example, Alice may wish to transfer the telephone call to her laptop computer, for example client computer 106, instead of to her mobile phone. When using a consultation call to transfer a call from client computer 104 to client computer 106, gateway server 110 is not needed because both client computer 104 and client computer 106 are on a packet switched network controlled by communications server 108. Other examples are possible.

Figure 3:
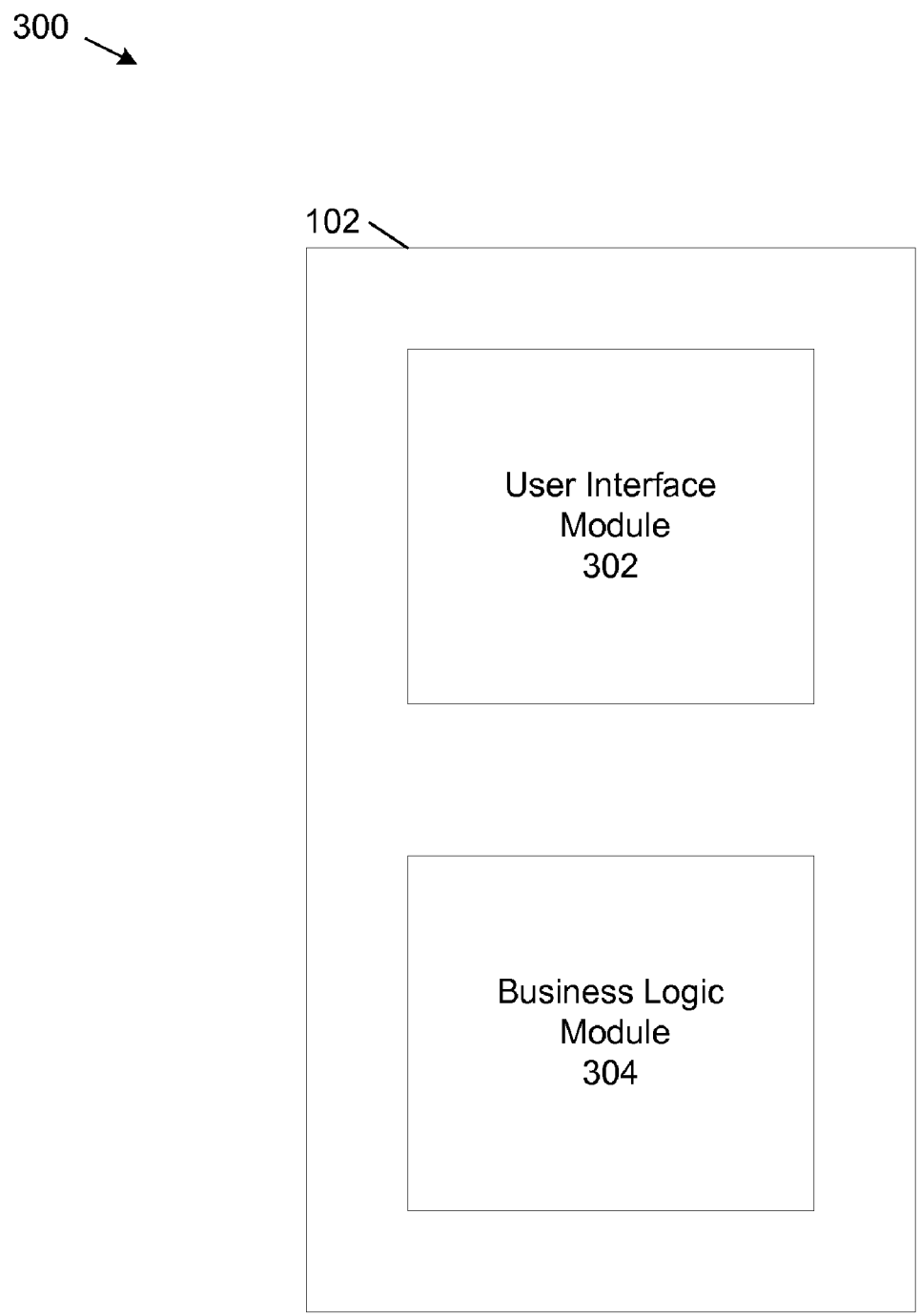
FIG. 3 shows example modules of an example client computer of FIG. 1.

FIG. 3 shows example modules of client computer 102. The example modules include a user interface module 302 and a business logic module 304. The user interface module 302 provides a user interface for the VOIP software program installed on client computer 102.

Figure 4:
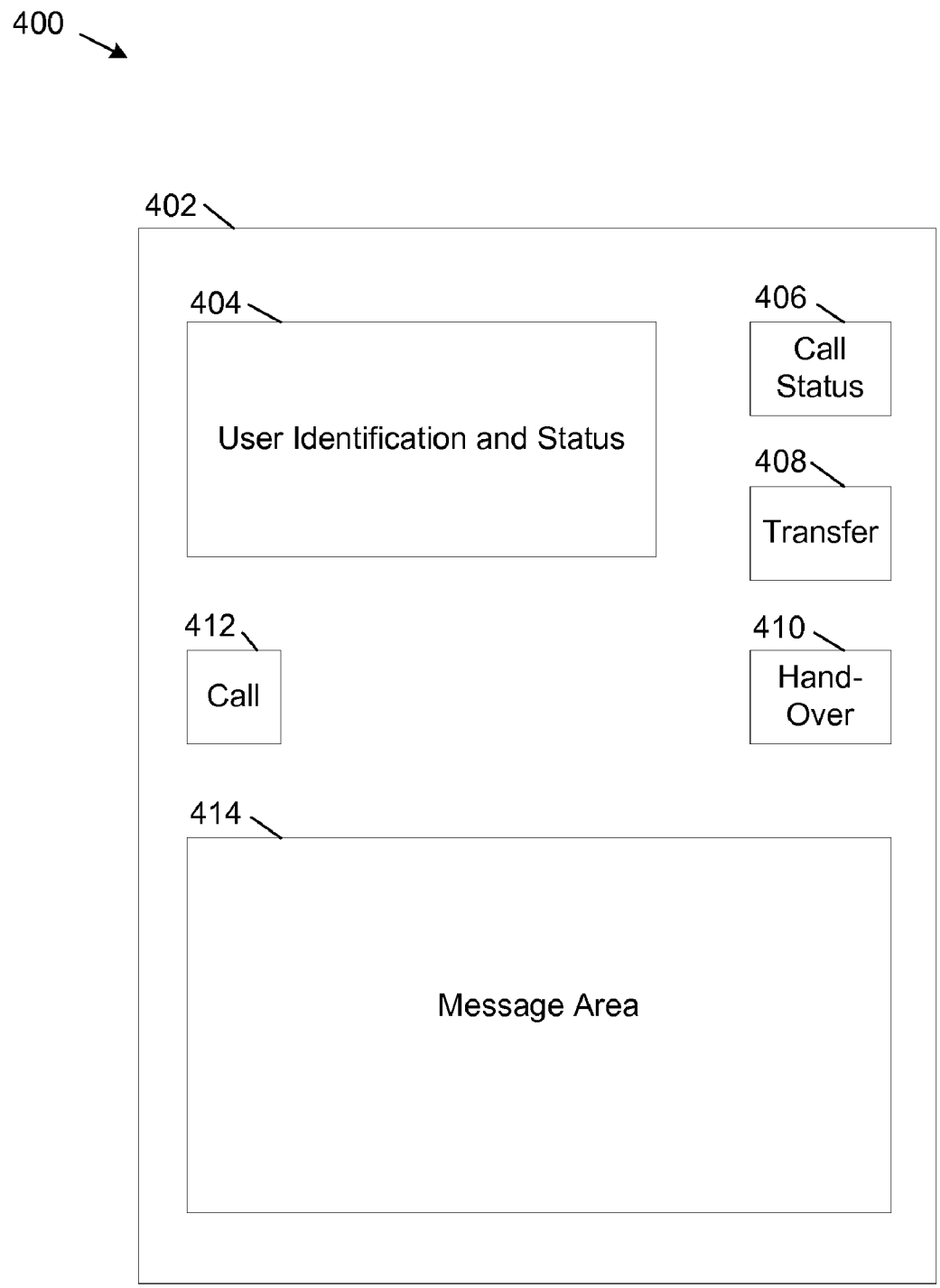
FIG. 4 shows an example user interface of an example client computer of FIG. 1.

FIG. 4 shows an example user interface 400 for client computer 102 that is generated by the user interface module 302. The user interface 400 includes an example user identification and status area 404 and an example call status area 406. The user identification and status area 404 identifies a user at the client computer, for example Alice, and provides information about the user, such as job title, whether the user is currently in a call, etc. The call status area 406 provides a graphic indicating the status of a call. For example, if the user is in a call, a graphic of a handset may be displayed.

The user interface 400 also includes example buttons to activating communication functions. Example functional buttons include transfer button 408 which is used to initiate a call transfer to another user, handover button 410 which is used to transfer a call to a device of the same user and example call button 412 which is used to initiate a call. Other buttons and additional functionality for the described buttons are possible.

The user interface 400 also includes an example message area 414 which lists status about a call and provides a history log of user actions. For example, the message area 414 may list all calls received, all calls initiated, all calls transferred, etc. Other uses for the message area 414 are possible.

Figure 5:
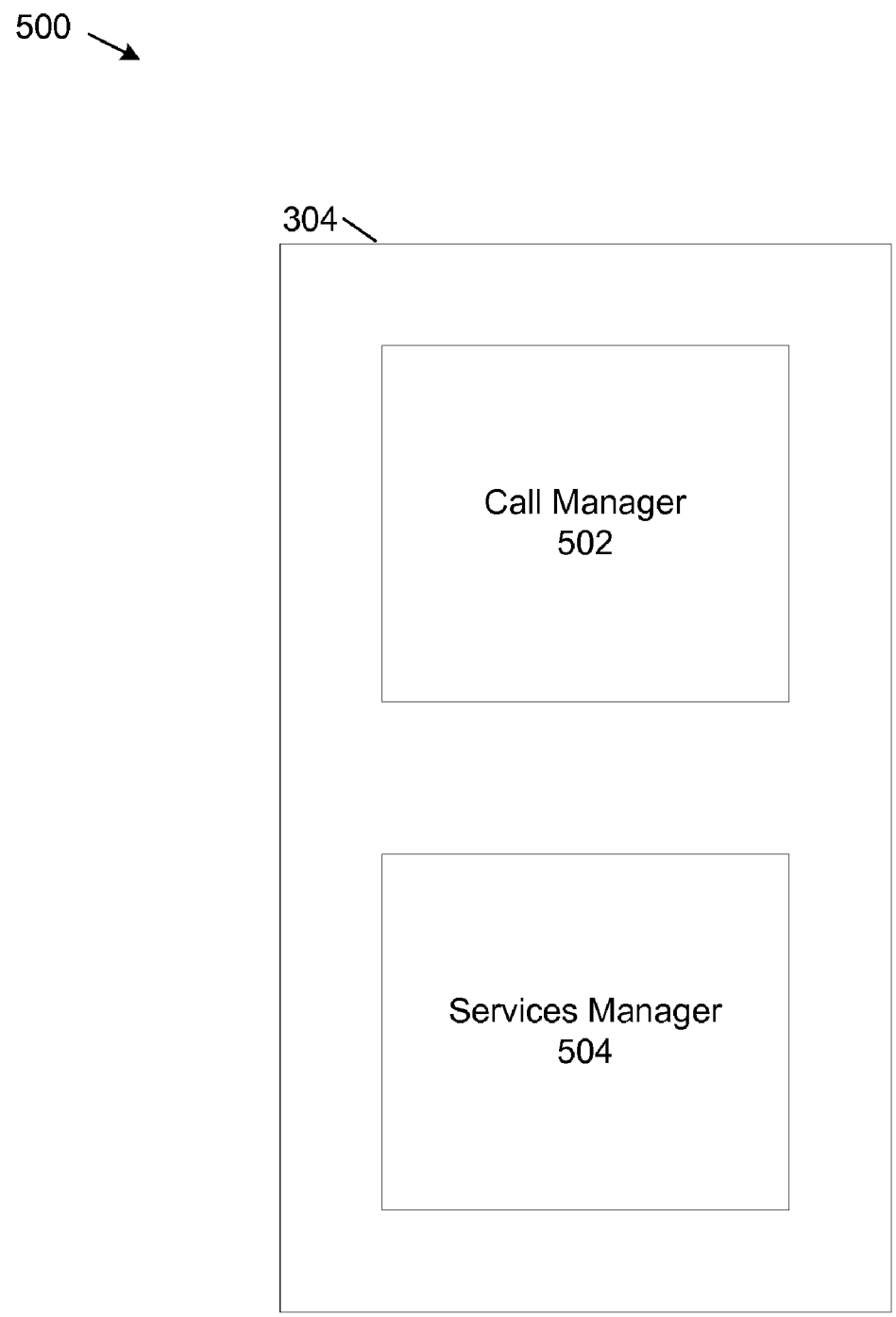
FIG. 5 shows example modules of an example business logic module of an example client computer of FIG. 1.

The business logic module 304 provides the functionality for managing calls and for providing additional services. FIG. 5 shows that the business logic module includes an example call manager 502 and an example services manager 504.

The call manager 502 establishes telephone call connections between client computer 102 and other devices. The call manager 502 also processes requests for telephone call connections received at client computer 102 from other devices. In examples, the call manager 502 initiates and receives messages that are structured according to the Session Initiation Protocol (SIP) during the establishment of each telephone call connection.

The services manager 504 provides services including managing multiple calls, processing standard requests to transfer calls and transferring a telephone call to a mobile phone of the same user via a consultation call. Other services are possible. When providing services the services manager 504 initiates and receives messages that are structured according to SIP.

Figure 6:
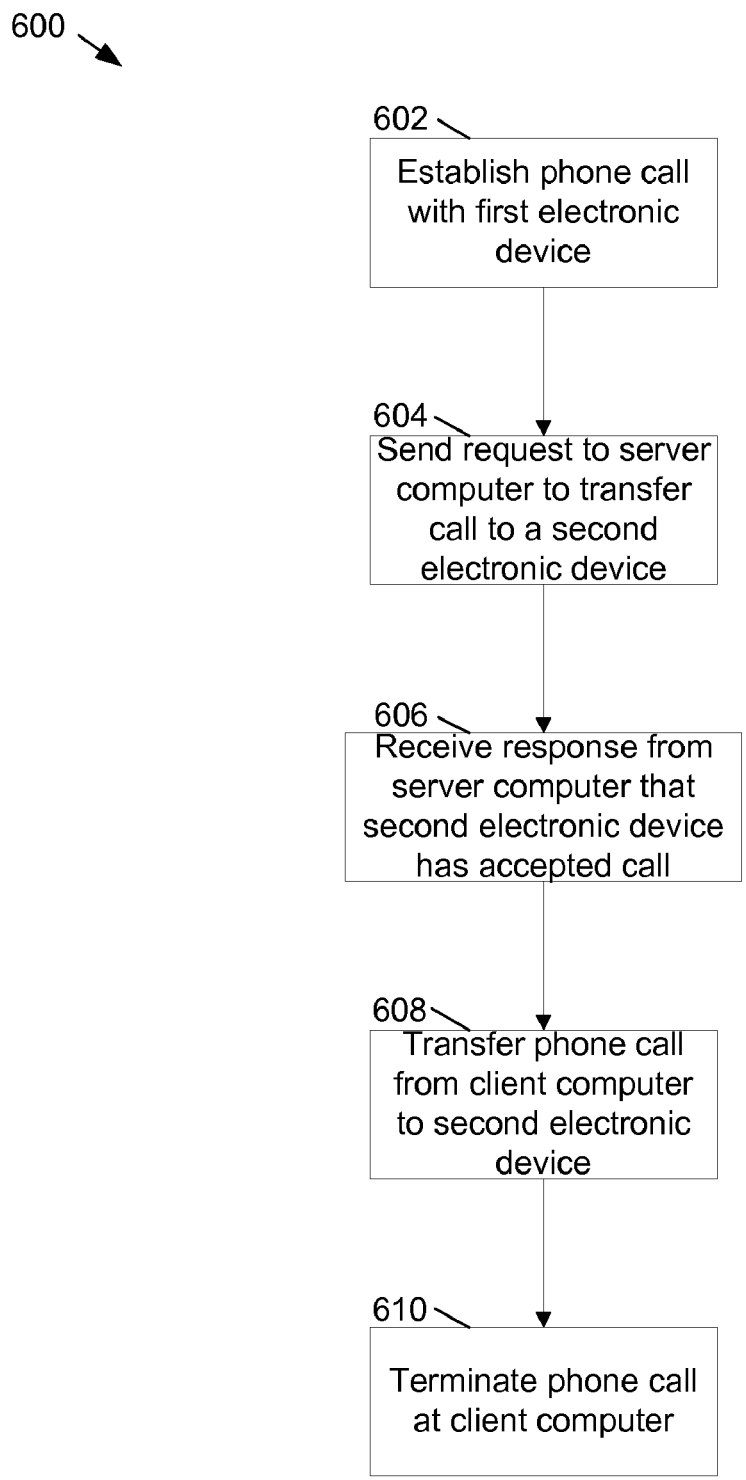
FIG. 6 shows a flowchart of a method for using a consultation call to transfer a telephone call from a client computer to a second electronic device.

FIG. 6 shows an example flowchart of a method 600 for transferring a telephone call from a client computer to a second electronic device. In method 600, the client computer and the second electronic device are of the same user. At operation 602, the client computer establishes a telephone call with a first electronic device. The client computer runs a software program that supports VOIP, such as Microsoft Office Communicator. The first electronic device may be another client computer that supports VOIP or a landline or mobile telephone connected via a circuit-switched telephone line. Other examples for the first electronic device are possible.

The telephone call is established over a network corresponding to the type of first electronic device and where it is located. For example, if the first electronic device is a client computer at the same physical location as the client computer that establishes the telephone call, the connection may be via a local area network. If the first electronic device is a client computer at a different physical location as the client computer that establishes the telephone call, the connection may be via the Internet. If the first electronic device is a desktop telephone, the connection may be via a gateway server that provides an interface to a PSTN. If the first electronic device is a mobile telephone, the connection may be via a wireless network accessible to a PSTN.

At operation 604, the client computer sends a request to a server computer to transfer the telephone call to a second electronic device. The second electronic device belongs to the same user as the client computer. An example request message is SIP Refer message 218. The server computer is typically a communication server that supports VOIP functionality, such as Microsoft Office Communications Server 2007. The second electronic device is typically a mobile telephone but it can be any electronic device that supports voice communication. For example, the second electronic device may be a desktop computer or laptop computer that supports VOIP software. The transfer operation is initiated by a user at the client computer pressing a handoff button on the user interface of the client computer. The transfer operation is performed using a consultation call to the second electronic device and does not require the use of an anchor server.

The request message to the server computer at operation 604, for example SIP Refer message 218, includes an identifier for the second electronic device and also includes an identifier for a third party to which the second electronic device is to connect. For example, the second electronic device is Alice's mobile phone 114 and the third party is Bob at client computer 102.

At operation 606, the client computer receives a response from the server computer that the second electronic device has received the SIP Refer message. At operation 608, the telephone call is handed off from the client computer to the second electronic device. At operation 610, the telephone call is terminated at the client computer.

Figure 7:
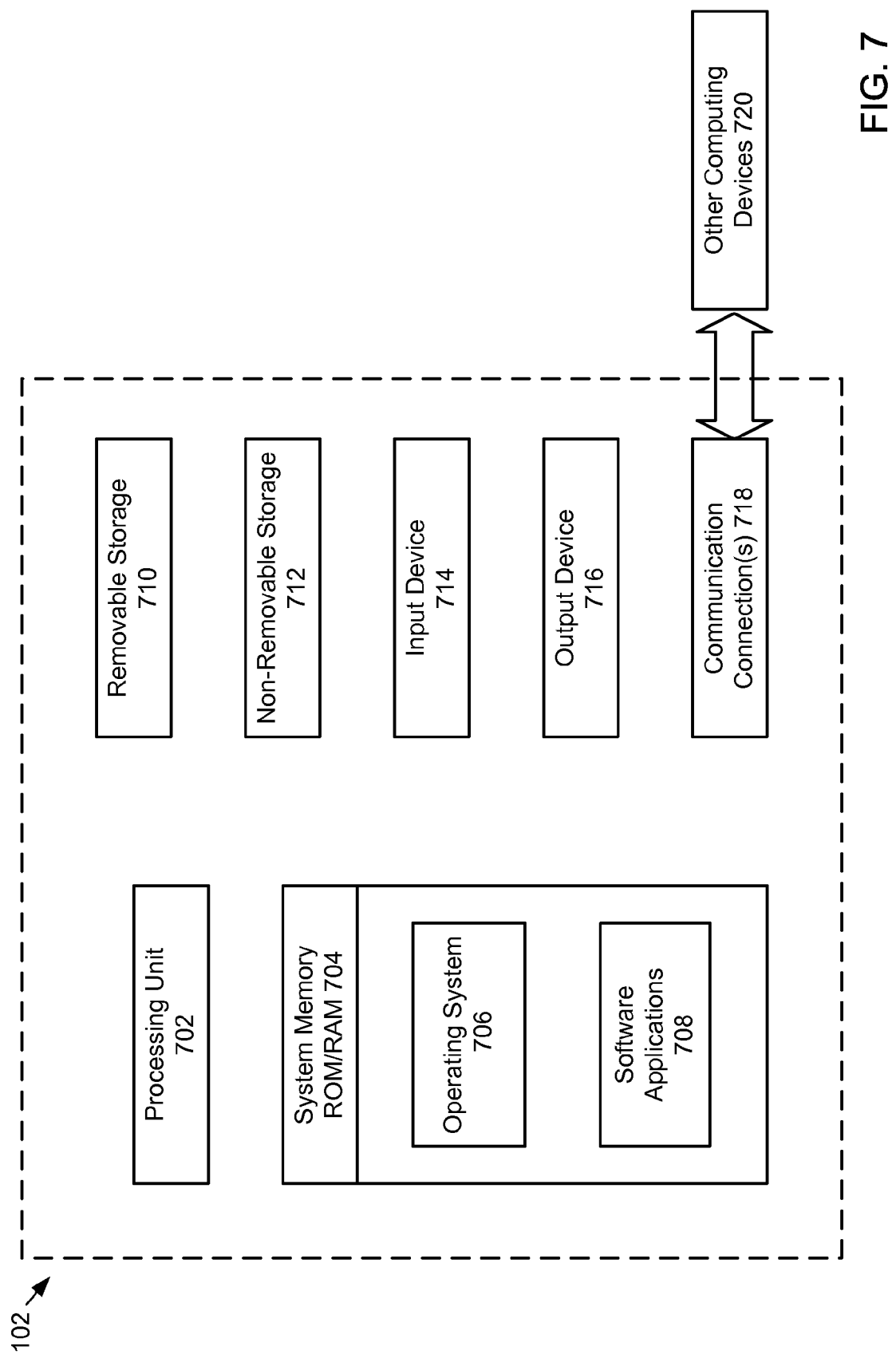
FIG. 7 shows example components of the client computer of FIG. 3.

With reference to FIG. 7, example components of client computer 102 are shown. In example embodiments, the client computer is a computing device. The client computer 102 can include input/output devices, a central processing unit ("CPU"), a data storage device, and a network device. The other client computers 104, 106, the communication server 108, and the gateway server 110 can be configured in a similar manner.

In a basic configuration, the client computer 102 typically includes at least one processing unit 702 and system memory 704. Depending on the exact configuration and type of computing device, the system memory 704 may be volatile (such as RAM), non-volatile (such as ROM, flash memory, etc.) or some combination of the two. System memory 704 typically includes an operating system 706 suitable for controlling the operation of a networked personal computer, such as the WINDOWS® operating systems from Microsoft Corporation of Redmond, Wash. or a server, such as Windows SharePoint Server 2007, also from Microsoft Corporation of Redmond, Wash. The system memory 704 may also include one or more software applications 708 and may include program data.

The client computer 102 may have additional features or functionality. For example, the client computer 102 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 7 by removable storage 710 and non-removable storage 712. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client computer 102. Any such computer readable storage media may be part of device 102. Client computer 102 may also have input device(s) 714 such as keyboard, mouse, pen, voice input device, touch input device, etc. Output device(s) 716 such as a display, speakers, printer, etc. may also be included.

The client computer 102 may also contain communication connections 718 that allow the device to communicate with other computing devices 720, such as over a network in a distributed computing environment, for example, an intranet or the Internet. Communication connection 718 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The various embodiments described above are provided by way of illustration only and should not be construed to limiting. Various modifications and changes that may be made to the embodiments described above without departing from the true spirit and scope of the disclosure.

What is claimed is:

1. A method for transferring a telephone call, the method comprising:
   at a first electronic device, establishing a connection for a telephone call between the first electronic device and a second electronic device;
   sending a request to a first server computer to transfer the telephone call from the first electronic device to a third electronic device, the first electronic device and the third electronic device having the same user, the request initiating a consultation call to the third electronic device, the request causing a connection to be established between the first electronic device and the third electronic device while maintaining the connection between the first electronic device and the second electronic device, the second electronic device not being put on hold while the connection between the first electronic device and the third electronic device is established, the first electronic device and the third electronic device being user devices of the same user, the connection between the first electronic device and the third electronic device being established as a result of the consultation call without use of an anchor server computer acting as a dedicated server computer that provides a fixed connection to a remote party in which a telephone call to the remote party can be switched from one user device to another user device;
   receiving a response from the first server computer that the third electronic device has accepted the telephone call;
   replacing the first electronic device with the third electronic device as a party in the telephone call with the second electronic device, continuity of the telephone call being maintained at the second electronic device during the time that the first electronic device is replaced with the third electronic device; and
   terminating the telephone call at the first electronic device.

2. The method of claim 1, wherein the first electronic device is a client computer.

3. The method of claim 1, wherein the third electronic device is a mobile telephone.

4. The method of claim 1, wherein the first electronic device runs software that supports a voice over Internet Protocol connection.

5. The method of claim 4, wherein the software further supports the Session Initiation Protocol.

6. The method of claim 1, wherein the first electronic device is a mobile telephone.

7. The method of claim 6, wherein the mobile telephone runs software that supports a voice over Internet Protocol connection.

8. The method of claim 1, wherein the request to transfer the telephone call is initiated from a user interface on the first electronic device.

9. The method of claim 8, wherein the request to transfer the telephone call further comprises pressing a button on the user interface representing a handoff of the telephone call, the handoff of the telephone call being a transfer of the telephone call to an electronic device of the same user as the first electronic device.

10. The method of claim 9, wherein the request to transfer the transfer the telephone call is added to a history log on the first electronic device.

11. The method of claim 1, wherein the request to transfer the telephone call is added to a history log on the first electronic device.

12. The method of claim 1, wherein the telephone call between the first electronic device and the second electronic device is initiated by the first electronic device.

13. The method of claim 1, wherein the telephone call between the first electronic device and the second electronic device is initiated by the second electronic device.

14. A first electronic computing device that is configured to run a communications application, the first electronic computing device comprising:
   a computer readable storage medium; and
   a processing unit that executes computer readable instructions stored on the computer readable storage medium to create:
      a user interface module that controls a user interface at the first electronic device; and
      a business logic module, the business logic module implementing communication functions for the communications application, the business logic module further comprising:
         a call manager that processes requests to establish a telephone call connection from the first electronic computing device to a second electronic computing device; and
         a services manager that processes requests to transfer the telephone call established at the first electronic computing device to a mobile phone, the first electronic device and the mobile phone having the same user, the telephone call being transferred using a consultation transfer call protocol that transfers the telephone call from the first electronic computing device to the mobile phone without putting the telephone call on hold, the service manager maintaining continuity of the telephone call on the first electronic device while the telephone call is being transferred, the first electronic computing device and the mobile phone being user devices of the same user, the telephone call being transferred from the first electronic computing device to the mobile phone as a result using the consultation transfer call protocol without use of an anchor server computer acting as a dedicated server computer that provides a fixed connection to a remote party in which a telephone call to the remote party can be switched from one user device to another user device.

15. The first electronic computing device of claim 14, wherein the first electronic computing device is a client computer.

16. The first electronic computing device of claim 14, wherein the first electronic computing device is a mobile telephone.

17. The first electronic computing device of claim 16, wherein the call manager and the services manager process requests using the Session Initiation Protocol.

18. The first electronic computing device of claim 16, wherein the request to transfer the telephone call is initiated from the user interface on the first electronic device.

19. The first electronic computing device of claim 16, wherein the services manager maintains a history log of communication related actions at the first electronic device, the communication related actions including requests to establish a telephone call, requests to transfer a telephone call and requests to end a telephone call.

20. A computer readable storage memory comprising instructions that, when executed by a processing unit of a client computer, cause the processing unit to:
   establish a connection for a telephone call between the client computer and a first electronic device, the client computer displaying status information about the telephone call on a display device;
   send a request to a first server computer to transfer the telephone call from the client computer to a mobile phone, the request initiating a consultation call to the mobile phone, the client computer and the mobile phone having the same user, the request causing a connection to be established between the client computer and the mobile phone while maintaining the connection between the client computer and the first electronic device and without putting the first electronic device on hold while the connection is established, the client computer and the first electronic device being user devices of the same user, the connection between the client computer and the first electronic device being established as a result of the consultation call without use of an anchor server computer acting as a dedicated server computer that provides a fixed connection to a remote party in which a telephone call to the remote party can be switched from one user device to another user device;
   receive a response from the first server computer that the mobile phone has accepted the telephone call;
   replace the client computer with the mobile phone as a party in the telephone call with the first electronic device, continuity of the telephone call being maintained at the first electronic device during the time that the client computer is replaced with the mobile phone;
   terminate the telephone call at the client computer; and
   update a history log on the client computer, the history log storing communication related actions including the request to establish the telephone call, the transfer of the telephone call from the client computer to the mobile phone and the termination of the telephone call at the client computer.

* * * * *